US010880463B2

(12) United States Patent
Wang et al.

(10) Patent No.: US 10,880,463 B2
(45) Date of Patent: Dec. 29, 2020

(54) REMOTE CONTROL OPERATION METHOD FOR GESTURE POST AND GESTURE POST REMOTE CONTROL DEVICE

(71) Applicant: Yungu (Gu'an) Technology Co., Ltd., Langfang (CN)

(72) Inventors: Fangning Wang, Langfang (CN); Gang Wang, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 16/512,660

(22) Filed: Jul. 16, 2019

(65) Prior Publication Data

US 2019/0342487 A1   Nov. 7, 2019

Related U.S. Application Data

(63) Continuation of application No. PCT/CN2018/088403, filed on May 25, 2018.

(30) Foreign Application Priority Data

Mar. 23, 2018   (CN) .......................... 2018 1 0245833

(51) Int. Cl.
*H04N 5/232*   (2006.01)
*G08C 17/02*   (2006.01)

(52) U.S. Cl.
CPC ......... *H04N 5/23203* (2013.01); *G08C 17/02* (2013.01); *G08C 2201/32* (2013.01)

(58) Field of Classification Search
None
See application file for complete search history.

(56) References Cited

U.S. PATENT DOCUMENTS

2018/0006840 A1* 1/2018 Su ...................... H01L 27/0886

FOREIGN PATENT DOCUMENTS

| CN | 101166237 | A | 4/2008 | |
|----|-----------|---|--------|---|
| CN | 101465961 | A | 6/2009 | |
| CN | 202133955 | U | 2/2012 | |
| CN | 102981624 | A * | 3/2013 | ............... G06F 3/01 |
| CN | 102981624 | A | 3/2013 | |
| CN | 103139359 | A | 6/2013 | |
| CN | 103167230 | A | 6/2013 | |
| CN | 103870802 | A | 6/2014 | |
| CN | 104394312 | A * | 3/2015 | ............. G06F 3/017 |
| CN | 104394312 | A | 3/2015 | |
| CN | 105306819 | A | 2/2016 | |
| CN | 106156589 | A | 11/2016 | |
| CN | 205680053 | U | 11/2016 | |
| TW | 201507767 | A | 3/2015 | |

OTHER PUBLICATIONS

PCT International Search Report dated Dec. 26, 2018 in International Application No. PCT/CN2018/088403.
Chinese Third Office Action for CN Application No. 201810245833.2 dated Jul. 3, 2020.

* cited by examiner

*Primary Examiner* — Adolf Dsouza
(74) *Attorney, Agent, or Firm* — Rimon PC (57) ABSTRACT

The present application discloses a remote control operation method for a gesture post that includes the following steps: collecting a motion track of the gesture post worn by a user, comparing the motion track with a preset track, and generating an operation instruction when the motion track is consistent with the preset track. The gesture post includes a sensing device.

10 Claims, 5 Drawing Sheets

FIG. 8

REMOTE CONTROL OPERATION METHOD FOR GESTURE POST AND GESTURE POST REMOTE CONTROL DEVICE

CROSS-REFERENCE TO RELATED APPLICATIONS

This application is a continuation of International Application No. PCT/CN2018/088403 filed on May 25, 2018, which claims priority to Chinese patent application No. 201810245833.2 filed on Mar. 23, 2018. Both applications are incorporated herein by reference in their entireties.

TECHNICAL FIELD

Embodiments of the present invention relate to the field of remote control technologies, particularly to a remote control operation method for a gesture post and a gesture post remote control device.

BACKGROUND

At present, functions of electronic devices are becoming more and more abundant, and the requirements for control methods of the electronic devices are getting higher and higher. In some special situations, it is necessary to liberate both hands to complete an operation, for example, photography, commonly known as taking pictures, which is a common activity in people's daily life and work. The photography is inseparable from pressing a shutter of a camera. For a long time, people usually press the shutter button directly to take pictures. In this case, for a mobile phone, one hand needs to hold the mobile phone to collect a photo scene, and the other hand needs to be lifted to the screen of the mobile phone and ready to press a photo button at all times to capture a beautiful moment, which will bring three problems. Firstly, the hands are always raised for a long time when taking pictures and the arms will be sore; secondly, when the beautiful moment occurs, the camera is easily to shake caused by clicking the photo button, which will influence photographic effect; and thirdly, requirements of special environment and a special industry cannot be satisfied, and the photography is limited by the location and the environment where the photographer is.

SUMMARY

In view of the above, a remote control operation method for a gesture post and a gesture post remote control device are provided according to the embodiments of the present invention, which solve problems including inconvenience in taking pictures with both hands, sore in arms due to holding up a camera for a long time during a photo taking process, poor photographic effect due to shake of the camera caused by clicking on a photo button, and limitation of distance and environment in taking pictures, thereby user's experience is improved.

A remote control operation method for a gesture post according to an embodiment of the present invention includes: collecting a motion track of the gesture post worn by a user, the gesture post comprising a sensing device; comparing the motion track which is collected with a preset track; and generating an operation instruction when the motion track is consistent with the preset track.

In an embodiment, the collecting a motion track of the gesture post worn by a user includes collecting motion data of the gesture post in real time by the sensing device in the gesture post; and calculating a 3D motion track of the gesture post according to the motion data.

In an embodiment, the collecting a motion track of the gesture post worn by a user further includes projecting the 3D motion track onto a normal plane to form a two-dimensional geometry.

In an embodiment, the gesture post includes at least one preset track.

In an embodiment, before the collecting a motion track of the gesture post worn by a user, the method further includes receiving an instruction to start the gesture post; and starting the sensing device of the gesture post.

In an embodiment, before the generating an operation instruction, the method further includes performing a wireless connection with an operated device.

In an embodiment, the operated device includes a photography device.

In an embodiment, the wireless connection includes a Bluetooth connection.

A gesture post remote control device includes a data collecting module configured to collect motion data of the gesture post remote control device; a data processing module configured to process the motion data collected by the data collection module to form a motion track of the gesture post remote control device; a determining module configured to determine whether the motion track is consistent with a preset track; and a communicating module configured to generate an operation instruction.

In an embodiment, the data collecting module includes an acceleration sensor configured to collect motion acceleration data of the gesture post remote control device; an angular velocity sensor configured to collect motion angle data of the gesture post remote control device; and a magnetic sensor configured to collect motion direction data of the gesture post remote control device.

In an embodiment, the data processing module includes a 3D motion track processing module configured to calculate a 3D motion track according to the motion data collected by the data collecting module; and/or a two-dimensional geometry processing module configured to project the 3D motion track onto a normal plane to form a two-dimensional geometry.

In an embodiment, the gesture post remote control device further includes a receiving module configured to receive an instruction of starting the gesture post remote control device from the user; and a controlling module configured to start or close the gesture post remote control device.

In an embodiment, the gesture post remote control device is flexible device.

According to the remote control operation method for the gesture post and the gesture post remote control device provided by the embodiments of the present invention, the motion track of the gesture post worn by the user is collected, and the collected motion track is compared with the preset track in the gesture post, if the collected motion track is consistent with the preset track in the gesture post, the gesture post generates the operation instruction, thereby the operated device is remotely controlled. The user's hands can be liberated by using this method to perform remote control, so that problems, such as sore in arms due to holding up the camera for a long time during a photo taking process and poor photographic effect due to vibration of the camera caused by clicking on the button, can be solved. In addition, a photographic behavior cannot be limited by distance and environment by using this method to take pictures, thereby user's experience is improved.

DETAILED DESCRIPTION

The technical solutions in the embodiments of the present invention are clearly and completely described in the following with reference to the accompanying drawings in the embodiments of the present invention. It is obvious that the described embodiments are only a part of the embodiments of the present invention, and not all of the embodiments. All other embodiments obtained by those skilled in the art based on the embodiments of the present invention without creative efforts are within the scope of the present invention.

Figure 1:
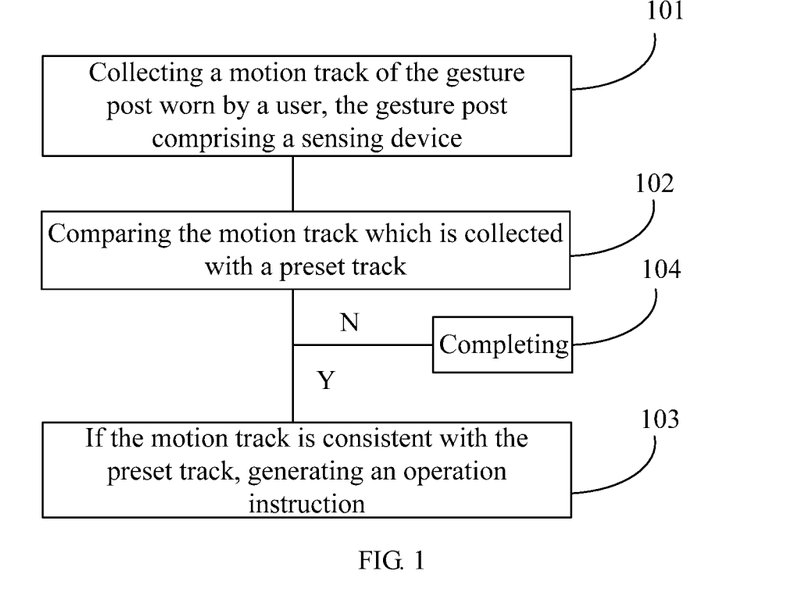
FIG. 1 is a flowchart of a remote control operation method for a gesture post according to an embodiment of the present invention.

FIG. 1 is a flowchart of a remote control operation method for a gesture post according to an embodiment of the present invention. As shown in FIG. 1, the remote control operation method for the gesture post includes the following steps.

S101: wearing the gesture post to one of the finger, the wrist and the head by a user. A position where the gesture post is worn can start to move after the gesture post is wore. Since the gesture post includes a plurality of sensing devices, the sensing devices collect corresponding data according to the motion of the gesture post, and after data collection is completed, a corresponding calculation and processing are carried out to obtain a motion track of a part of the user wearing the gesture post.

The gesture post may be worn on the finger, the wrist or the head, etc. The specific wearing position of the gesture post is not limited in the present invention.

The gesture post may be fixed to the user's wearing position by means of a buckle, and may also be worn by sticking. The specific wearing mean is not limited by the present invention.

S102: comparing the motion track with a preset track in the gesture post after the motion track of the gesture post worn by the user is collected. The gesture post includes one or more preset tracks, and the motion track needs to be the same as at least one of the preset tracks, so that step 102 is completed to enter into the next step.

The number of preset tracks may be one or more, and the specific number of preset tracks is not limited in the present invention.

S103: generating an operation instruction when a result of a specific similarity calculation preformed in step 102 satisfies a certain threshold range, which indicates that the collected motion track of the gesture post worn by the user is consistent with the preset track, and a corresponding operation is performed by an operated device after receiving the operation instruction. The similarity calculation includes: placing the collected motion track of the user and the preset track in a same coordinate system, setting a same parameter range for the motion track and the preset track, and putting starting points of the motion track and the preset track at the coordinate origin. So that whether the motion track is consistent with the preset track can be determined by comparing the angle between a tangent line of the motion track and the horizontal axis with the angle between a tangent line of the preset track and the horizontal axis. The numerical value of the comparison result may be the integral of the absolute value of the difference between curvature functions of the motion track and the preset track. The smaller the value is, the more similar the motion track and the preset track are. The threshold range may be a range set by an artificial one, which includes a range of the integrals of the absolute values of the differences between numerical value curvature functions. If the numerical value of the comparison result of the motion track and the preset track is within the threshold range, the motion track is consistent with the preset track, and if the numerical value of the comparison result of the motion track and the preset track is not within the threshold range, the motion track and the preset track are inconsistent. Thereby although the motion track and the preset track are not highly consistent, structures of the motion track and the preset track are the same to ensure the collected motion track and the preset track also be considered to be consistent.

The numerical value of the comparison result of the motion track and the preset track may be the integrals of the absolute values of the differences between the numerical value curvature functions, and may also be other numerical values. The specific numerical value type of the comparison result is not limited in the present invention.

S104: after comparing the motion track of the gesture post worn by the user collected by the gesture post with the preset track, if the motion track and the preset track are inconsistent, the gesture post does not react, and continues to wait and monitors in real time whether user's next action starts. Once it is monitored that the user's next action starts, step 101 is continually repeated.

By performing the remote control operation according to the above steps 101 to 104, the user's hands can be liberated, the remote control operation is not limited by region, environment and distance, and the remote control operation is convenient and flexible to use, thereby user's experience is improved.

Figure 2:
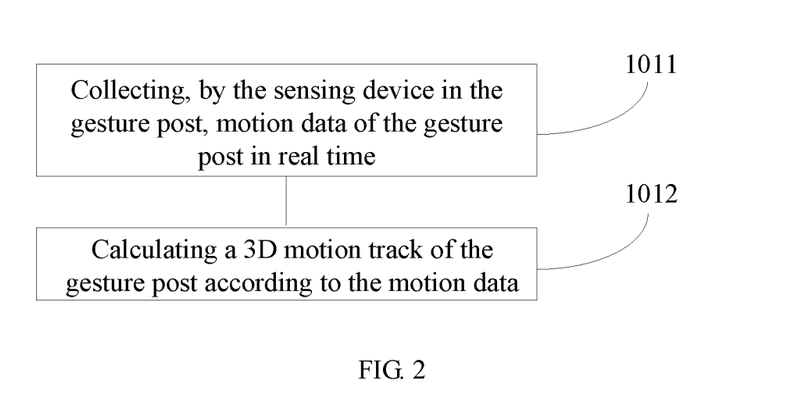
FIG. 2 is a flowchart of a remote control operation method for a gesture post according to another embodiment of the present invention.

FIG. 2 is a flowchart of a remote control operation method for a gesture post according to another embodiment of the present invention. As shown in FIG. 2, collecting the motion track of the gesture post worn by the user in step 101 includes the following steps.

S1011: collecting relevant data during a motion process of the gesture post worn by the user in real time by the sensing device in the gesture post, after the user's motion is monitored by the gesture post, so that the user's motion track can be better described.

S1012: calculating a 3D motion track of the gesture post worn by the user according to the motion data collected in the step 1011 by a corresponding algorithm in a gesture post processor. After the user starting to move, an acceleration sensor in the gesture post collects data of motion acceleration, an angular velocity sensor collects data of a motion angle of the motion, a magnetic sensor collects data of a motion direction of the motion, and the like, and the user's 3D motion track is depicted in a coordinate system according to the above data through a corresponding algorithm (such as an image fusion algorithm, etc.).

The corresponding algorithm mentioned in this embodiment includes an image fusion algorithm or other algorithms, etc., and the specific corresponding algorithm manner is not limited in this embodiment.

The 3D motion track of the user is compared with the preset track according to this method provided by this embodiment, as the preset track is also a 3D track, therefore the comparison result is more accurate, and accuracy is improved.

Figure 3:
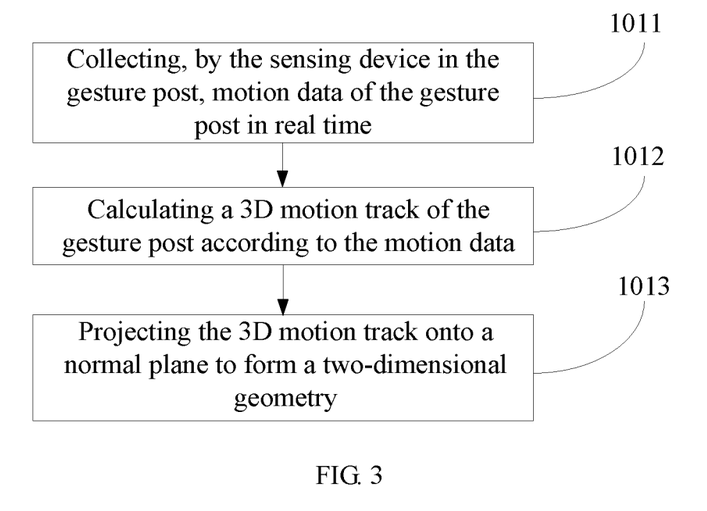
FIG. 3 is a flowchart of a remote control operation method for a gesture post according to another embodiment of the present invention.

FIG. 3 is a flowchart of a remote control operation method for a gesture post according to another embodiment of the present invention. As shown in FIG. 3, the collecting a motion track of the gesture post worn by a user further includes:

S1013: projecting the 3D motion track processed and obtained in step 1012 onto a normal plane to form a two-dimensional geometry, and comparing the two-dimensional geometry with the preset track, the preset track is two-dimensional in this case. The comparison method is simplified by comparing the two-dimensional geometry with the preset track, and time is saved, efficiency is improved.

The 3D motion track may be used to compare with the preset track, and the two-dimensional geometry may be used to compare with the preset track. The specific comparative manner is not limited in the present invention.

In an embodiment of the present invention, there is at least one preset track. One operation instruction can be generated when the collected motion track of the gesture post worn by the user is consistent with one of the preset tracks. Different motion tracks may generate a same operation instruction or generate different operation instructions. For example: 1. The motion track of drawing a circle by the finger may control the camera in the operated device to take pictures and the like. 2. Drawing a circle by one of the finger or by one arm may control the camera in the operated device to take pictures and the like. 3. Finger swing may open a video of the operated device, and arm swing may answer a call of the operated device and the like.

It should be understood that different actions may generate different operation instructions to control the same operated device, or different actions may generate different operation instructions to control different operated devices, and the specific type of the operated device controlled by the operation instruction is not limited by the present invention.

Figure 4:
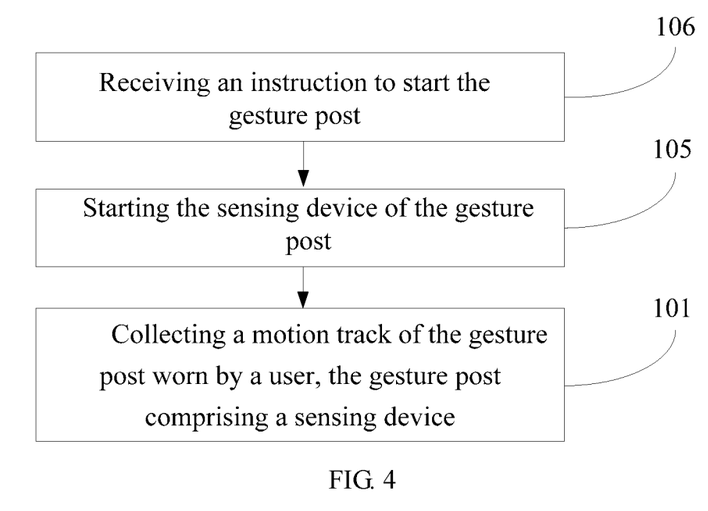
FIG. 4 is a flowchart of a remote control operation method for a gesture post according to another embodiment of the present invention.

FIG. 4 is a flowchart of a remote control operation method for a gesture post according to another embodiment of the present invention. As shown in FIG. 4, before step 101, the method further includes:

S105: receiving an instruction to start the gesture post. The gesture post may include a switch, and after the user issues an instruction to start the gesture post, the gesture post receives the instruction from the user to start the gesture post.

The user may send the instruction to start the gesture post by clicking a button or touching a push button or turning on the wireless net of the mobile terminal. The specific manner of starting the instruction of the gesture post is not limited in the present invention.

S106: starting the sensing device of the gesture post after the gesture post receives the instruction to start the gesture post, and monitoring in real time whether the user starts to perform an action after the sensing device of the gesture post is started, if the action preformed by the user is monitored, starting step 101.

The gesture post will be closed or in a standby state when the gesture post is not used for a long time, and the users can start the gesture post on their own whenever they need the gesture post, so that power consumption of the gesture post can be saved, and use time is extended.

Figure 5:
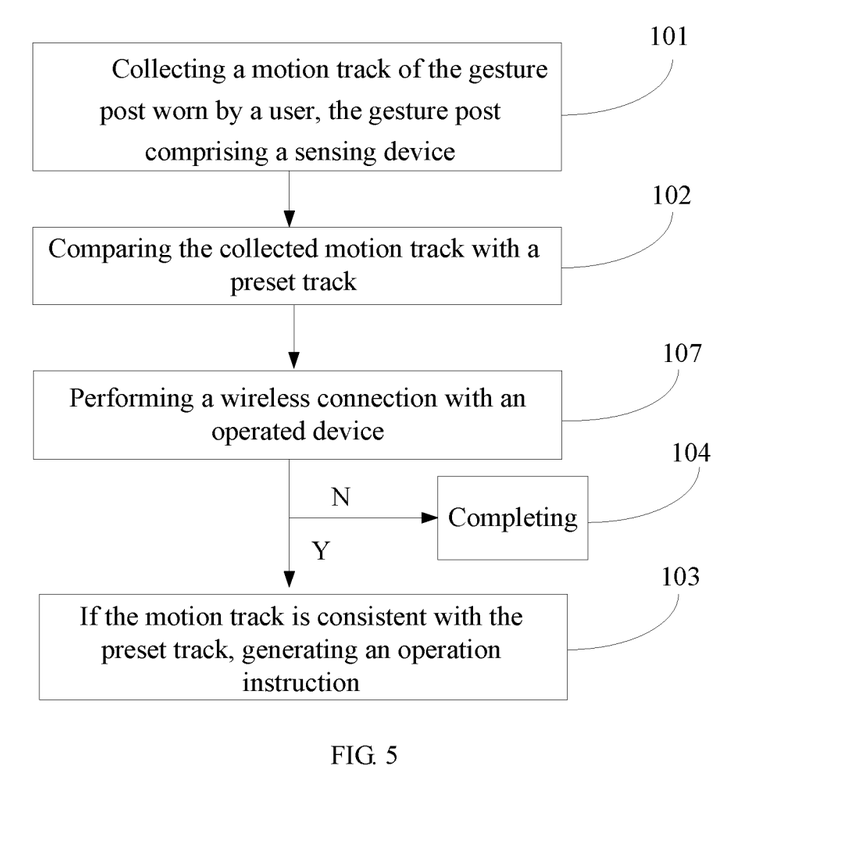
FIG. 5 is a flowchart of a remote control operation method for a gesture post according to another embodiment of the present invention.

FIG. 5 is a flowchart of a remote control operation method for a gesture post according to another embodiment of the present invention. As shown in FIG. 5, before generating an operation instruction, the method further includes:

S107: performing a wireless connection between the gesture post and the operated device. When the gesture post is connected to the operated device successfully, the function of remotely controlling the operated device by the gesture post is realized by sending operation instructions to the operated device. Since electronic devices existed on the market basically have a wireless connection function, it is not necessary to add additional components on the operated device by wirelessly connecting the gesture post with the operated device, so that cost is saved. The mode of the wireless connection may be a Bluetooth, the connection using the Bluetooth is not limited by geography and environment, and is convenient and quick.

The connection mode between the gesture post and the operated device may be Bluetooth, or Wifi and so on. The specific connection mode between the gesture post and the operated device is not limited in the present invention.

In an embodiment of the present invention, the operated device may include a photography device. The switch of the gesture post is turned on, and after the sensing device in the gesture post collects the motion track of the gesture post, the motion track of the gesture post is compared with the preset track in the gesture post. If the motion track of the gesture post is consistent with the preset track, the gesture post generates a photography instruction. The camera takes a photo after receiving the photography instruction. In process of taking pictures according to this method, the user's hands can be liberated, sore in arms caused by holding the camera for a long time can be prevented, and poor photographic effect due to vibration of the camera caused by clicking on a button can be solved. In addition, taking pictures according to this method is not limited by environment and distance, user's experience is improved.

The operated device may be an electronic device such as the photography device or a talking device or a video device, and the specific type of the operated device is not limited in the present invention.

Figure 6:
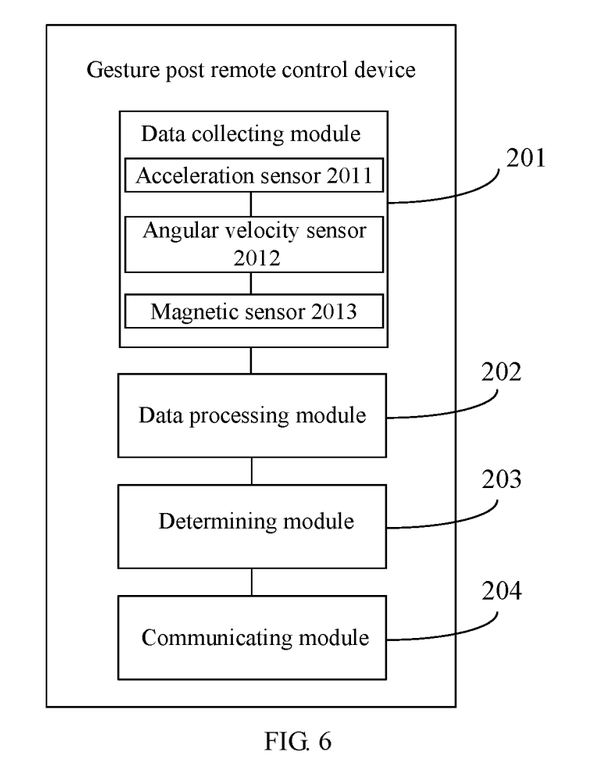
FIG. 6 is a block diagram of a gesture post remote control device according to an embodiment of the present invention.

FIG. 6 is a block diagram of a gesture post remote control device according to an embodiment of the present invention. As shown in FIG. 6, the gesture post remote control device includes:

A data collecting module 201, or can be called data into collecting circuit, configured to collect motion data of the gesture post remote control device. After the gesture post monitors the motion track of a user, the data collecting module 201 starts to collect the motion data of the user in real time.

A data processing module 202, or can be called into data processing circuit, configured to processing the collected motion data to form a motion track of the gesture post worn by the user, after the motion data is collected by the data collecting module 201.

A determining module 203 configured to determine whether the motion track of the gesture post worn by the user is consistent with a preset track, that is, the motion track of the gesture post worn by the user formed by the data processing module 202 is compared with the preset track to determine whether the motion track is consistent with the preset track. If the motion track is consistent with the preset track, the gesture post generates an operation instruction.

A communicating module 204, or can be called into communicating circuit, configured to establish a connection between the gesture post and the operated device. After the determining module 203 determines that the motion track of the gesture post worn by the user is consistent with the preset track, the communication module 204 of the gesture post generates the operation instruction. A corresponding operation will be completed by the operated device after the operation instruction is received, thereby a remote control function is realized. Since electronic devices existed on the market basically have a communicating module. it is not necessary to add additional components on the operated device by connecting the gesture post with the operated device via communicating module, and this gesture post remote control device is not limited by environment and distance, and the gesture post remote control device is convenient and efficient.

The connection mode between the gesture post and the operated device may be Bluetooth, or Wifi and so on. The specific connection mode between the gesture post and the operated device is not limited in the present invention.

When a remote control operation is performed by the above module, the user's hands can be liberated and the gesture post remote control device is not limited by the distance and environment, thereby user experience is improved.

In an embodiment of the present invention, the data collecting module 201 includes: an acceleration sensor 2011 configured to collect motion acceleration data of the gesture post remote control device; an angular velocity sensor 2012 configured to collect motion angle data of the gesture post remote control device; and a magnetic sensor 2013 configured to collect motion direction data of the gesture post remote control device.

The motion data of the gesture post worn by the user can be comprehensively and accurately collected by the acceleration sensor 2011, the angular velocity sensor 2012 and the magnetic sensor 2013, so that the calculated motion track is closer to the actual motion track of the gesture post, thereby accuracy is improved.

Figure 7:
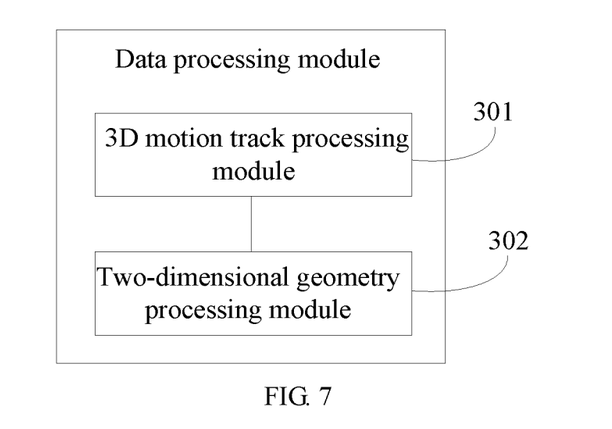
FIG. 7 is a block diagram of a data processing module according to an embodiment of the present invention.

FIG. 7 is a block diagram of a data processing module according to an embodiment of the present invention. As shown in FIG. 7, the data processing module 202 includes a 3D motion track processing module 301 and a two-dimensional geometry processing module 302. After the gesture post monitors that the user starts to move, the accelerometer, the gyroscope and the magnetic sensor in the gesture post collects relevant data during a motion process of the gesture post worn by the user in real time, and the 3D motion track processing module 301 is configured to process the collected motion data and calculate a 3D motion track of the gesture post worn by the user according to the collected motion data. The two-dimensional geometry processing module is configured to project the 3D motion track of the gesture post worn by the user which is calculated by the 3D motion track processing module 301 onto a normal plane to form a two-dimensional geometry.

Comparing the two-dimensional geometry generated by procession of the 3D motion track processing module 301 and the two-dimensional geometry processing module 302 with at least one preset two-dimensional geometry can simplify the comparison process can be simplified by, so that time is saved, and efficiency is improved.

Figure 8:
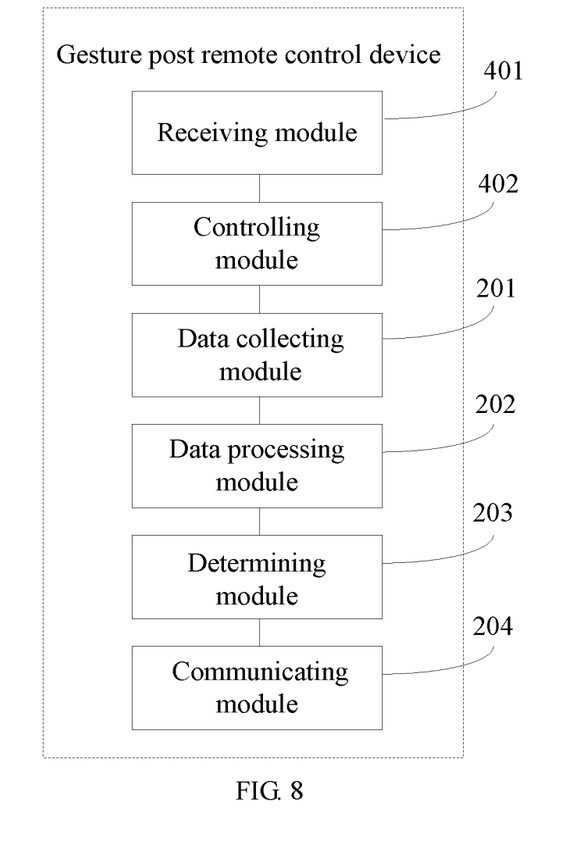
FIG. 8 is a block diagram of a gesture post remote control device according to another embodiment of the present invention.

FIG. 8 is a block diagram of a gesture post remote control device according to another embodiment of the present invention. As shown in FIG. 8, the gesture post remote control device further includes: a receiving module 401 configured to receive an instruction that turns on the gesture post remote control device by the user. The gesture post may include a switch, and after the user issues the instruction to start the gesture post, the receiving module 401 of the gesture post receives the instruction to start the gesture post; a controlling module 402 configured to start the gesture post after the instruction to start the gesture post is received by the receiving module 401, and monitoring the user's motion track in real time after the gesture post is started.

The gesture post will be closed or in a standby state when the gesture post is not used for a long time, and the users can start the gesture post on their own whenever they need the gesture post, so that power consumption of the gesture post can be saved, and use time is extended.

In an embodiment of the present invention, the gesture post remote control device may be a flexible device, and may be bent freely to fit or surround any part of the user's body. The specific shapes of the gesture post are not limited by the present invention.

The above are only the preferred embodiments of the present invention, and are not intended to limit the scope of the present invention. Any modifications, equivalent replacements, improvements, etc. made within the spirit and principles of the present invention should be included within the scope of the present invention.

What is claimed is:

1. A remote control operation method for a gesture post, comprising:
   collecting a motion track of the gesture post worn by a user, the gesture post comprising a sensing device;
   collecting motion data of the gesture post in real time by the sensing device in the gesture post;
   calculating the motion track as a 3D motion track of the gesture post according to the motion data;
   comparing the 3D motion track with a preset track; and
   generating an operation instruction when the motion track is consistent with the preset track;
   wherein the collecting a motion track of the gesture post worn by a user further comprises:
   projecting the 3D motion track onto a normal plane to form a two-dimensional geometry.

2. The remote control operation method of claim 1, wherein the comparing the motion track with a preset track comprises:
   comparing the motion track with at least one preset track.

3. The remote control operation method of claim 1, wherein before the collecting a motion track of the gesture post worn by a user, the method further comprises:
   receiving an instruction to start the gesture post; and
   starting the sensing device of the gesture post.

4. The remote control operation method of claim 1, wherein before the generating an operation instruction, the method further comprises performing a wireless connection with an operated device.

5. The remote control operation method of claim 4, wherein the wireless connection comprises a Bluetooth connection.

6. The remote control operation method of claim 4, wherein the operated device comprises a photography device.

7. A gesture post remote control device, comprising:
sensing device configured to collect motion data of the gesture post remote control device;
one or more processors configured to process the motion data collected by a data collection module to form a motion track of the gesture post remote control device;
a 3D motion track processing module configured to calculate a 3D motion track according to the motion data collected by the data collecting module;
a determining module configured to determine whether the motion track is consistent with a preset track; and
a communicating module configured to generate an operation instruction
wherein the gesture post remote control device further comprises:
a two-dimensional geometry processing module configured to project the 3D motion track onto a normal plane to form a two-dimensional geometry.

8. The gesture post remote control device of claim 7, wherein the sensing device comprises:
an acceleration sensor configured to collect motion acceleration data of the gesture post remote control device;
an angular velocity sensor configured to collect motion angle data of the gesture post remote control device; and
a magnetic sensor configured to collect motion direction data of the gesture post remote control device.

9. The gesture post remote control device of claim 7, further comprising:
a receiving module configured to receive an instruction of starting the gesture post remote control device from the user; and
a controlling module configured to start or close the gesture post remote control device.

10. The gesture post remote control device of claim 7, wherein the gesture post remote control device is flexible device.

* * * * *